(12) United States Patent
Liu et al.

(10) Patent No.: US 12,475,629 B2
(45) Date of Patent: Nov. 18, 2025

(54) SYSTEMS AND METHODS FOR IMAGE RENDERING

(71) Applicant: SHANGHAI UNITED IMAGING HEALTHCARE CO., LTD., Shanghai (CN)

(72) Inventors: Xiang Liu, Shanghai (CN); Jun Wan, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 215 days.

(21) Appl. No.: 18/346,144

(22) Filed: Jun. 30, 2023

(65) Prior Publication Data
US 2023/0360308 A1    Nov. 9, 2023

Related U.S. Application Data

(63) Continuation-in-part of application No. PCT/CN2021/143187, filed on Dec. 30, 2021.

(30) Foreign Application Priority Data

Dec. 30, 2020 (CN) .......................... 202011616018.6

(51) Int. Cl.
*G06T 15/00* (2011.01)
*G06T 15/06* (2011.01)

(52) U.S. Cl.
CPC ............ *G06T 15/005* (2013.01); *G06T 15/06* (2013.01); *G06T 2210/21* (2013.01); *G06T 2210/41* (2013.01); *G06T 2210/56* (2013.01)

(58) Field of Classification Search
CPC ... G06T 15/005; G06T 15/06; G06T 2210/21; G06T 2210/41; G06T 2210/56; G06T 15/08; G16H 30/20; G16H 30/40
See application file for complete search history.

(56) References Cited

U.S. PATENT DOCUMENTS

| | | | |
|---|---|---|---|
| 2004/0125103 A1* | 7/2004 | Kaufman | G06T 15/08 345/419 |
| 2011/0228997 A1* | 9/2011 | Sharp | G06T 19/00 382/128 |

(Continued)

FOREIGN PATENT DOCUMENTS

| | | |
|---|---|---|
| CN | 102708585 A | 10/2012 |
| CN | 102737401 A | 10/2012 |

(Continued)

OTHER PUBLICATIONS

International Search Report in PCT/CN2021/143187 mailed on Mar. 29, 2022, 4 pages.

(Continued)

*Primary Examiner* — Kee M Tung
*Assistant Examiner* — Xiaoming We
(74) *Attorney, Agent, or Firm* — METIS IP LLC

(57) ABSTRACT

Systems and methods for image rendering are provided. The methods may include: rasterizing a primitive to determine rendering parameters of primitive pixel points representing the primitive in a target image; determining depth of volume data pixel points representing volume data in a preset region in the target image; and performing a physical rendering operation on the volume data to obtain the target image based on the depth of the volume data pixel points, color information of the volume data pixel points, and the rendering parameters, wherein the rendering parameters at least include depth of the primitive pixel points and color information of the primitive pixel points.

15 Claims, 6 Drawing Sheets

(56) References Cited

U.S. PATENT DOCUMENTS

2014/0184600 A1 7/2014 Steen
2018/0330538 A1 11/2018 Petkov
2021/0279942 A1* 9/2021 Petkov ...................... G06T 7/50

FOREIGN PATENT DOCUMENTS

| CN | 107492138 A | 12/2017 |
|---|---|---|
| CN | 111508052 A | 8/2020 |

OTHER PUBLICATIONS

Written Opinion in PCT/CN2021/143187 mailed on Mar. 29, 2022, 5 pages.

* cited by examiner

400

```
┌─────────────────────────────────────────────────────┐
│ Rasterizing a primitive that has a predetermined    │      410
│ shape to determine rendering parameters of          │─────
│ primitive pixel points in a target image            │
└─────────────────────────────────────────────────────┘
                         │
                         ▼
┌─────────────────────────────────────────────────────┐
│ Determining depth of volume data pixel points in a  │      420
│ preset display range in the target image            │─────
└─────────────────────────────────────────────────────┘
                         │
                         ▼
┌─────────────────────────────────────────────────────┐
│ Performing a physical rendering operation on the    │      430
│ volume data to obtain the target image based on     │─────
│ depth of the volume data pixel points, color        │
│ information of the volume data pixel points, and    │
│ the rendering parameters, wherein the rendering     │
│ parameters at least include depth of the primitive  │
│ pixel points and color information of the primitive │
│ pixel points                                        │
└─────────────────────────────────────────────────────┘
```

FIG. 4

SYSTEMS AND METHODS FOR IMAGE RENDERING

CROSS-REFERENCE TO RELATED APPLICATIONS

This application is a Continuation-in-part application of International Application No. PCT/CN2021/143187, filed on Dec. 30, 2021, which claims priority to Chinese patent application No. 202011616018.6, filed on Dec. 30, 2020, the entire content of which is incorporated herein by reference.

TECHNICAL FIELD

This application relates to the field of image processing, in particular to methods, systems, devices, and mediums for image rendering.

BACKGROUND

Currently, on a medical image postprocessing workstation, gradual physical rendering is usually conducted on the volume data acquired by medical imaging equipment. A mesh primitive such as a bounding box or a clipping surface needs to be rendered along with the volume data in the same scene when doctors need to adjust the preset region of the volume data through the interaction of mesh primitive such as the bounding box or the clipping surface to better observe a certain part of the human body structure and tissues in the volume data.

Generally, to render the mesh primitive such as the bounding box or the clipping surface along with the volume data in the same scene, the conventional method is to physically render the volume data and the mesh primitive at the same time. However, some special primitives, such as a wireframe used as a bounding box, has no area and thus light cannot be scattered and cannot be rendered directly by ray-tracing. Moreover, because in the process of ray-tracing, the primitive and volume data are rendered using the same light, the rendering light and shadow effects of the primitive and the volume data would affect each other, resulting in poor medical image display effects.

SUMMARY

According to an aspect of the present disclosure, an image rendering method is provided. The image rendering method may be implemented on a computing device having at least one processor and at least one non-transitory storage medium. The method may include rasterizing a primitive having a predetermined shape to determine rendering parameters of primitive pixel points representing the primitive in a target image; determining depth of volume data pixel points representing volume data in a preset region in the target image; and performing a physical rendering operation on the volume data to obtain the target image based on depth of the volume data pixel points, color information of the volume data pixel points, and the rendering parameters, wherein the rendering parameters at least include depth of the primitive pixel points and color information of the primitive pixel points.

In some embodiments, the color information may include primary color information and an opacity.

In some embodiments, the performing a physical rendering operation on the volume data to obtain the target image may include for each pixel point in the target image, in response to a determination that the pixel point is both a primitive pixel point and a volume data pixel point, that depth of the corresponding primitive pixel point is less than depth of the corresponding volume data pixel point, and that the opacity of the pixel point is less than the opacity of the primitive pixel point, designating color data of the corresponding primitive pixel point as color data of the pixel point; and in response to a determination that the pixel point is not a primitive pixel or the pixel point is not a volume data pixel point, or a determination that the depth of the corresponding primitive pixel point is greater than or equal to the depth, or a determination that the opacity of the pixel point is greater than or equal to the opacity of the primitive pixel point, performing a ray-tracing operation on the pixel point to obtain a ray-tracing result, and performing the physical rendering operation based on the ray-tracing result.

In some embodiments, the performing a ray-tracing operation on the pixel point to obtain a ray-tracing result and performing the physical rendering operation based on the ray-tracing result may include for each pixel point in the target image, in response to a determination that the pixel point is both a primitive pixel point and a volume data pixel point, that depth of the corresponding primitive pixel point is greater than depth of the corresponding volume data pixel point, and that the opacity of the pixel point is zero, mixing, based on the opacity of the corresponding primitive pixel point, a color of the corresponding primitive pixel point and a background color to determine a final rendered color of the pixel point, and in response to a determination that the pixel point is both a primitive pixel point and a volume data pixel point, that depth of the corresponding primitive pixel point is greater than depth of the corresponding volume data pixel point, and that the opacity of the pixel point is not zero, designating a color of the corresponding volume data pixel point as the final rendered color of the pixel point.

In some embodiments, the performing a ray-tracing operation on the pixel point to obtain a ray-tracing result and performing the physical rendering operation based on the ray-tracing result may include: for each pixel point in the target image, in response to a determination that the pixel point is a primitive pixel point and that the pixel point is not a volume data pixel point in the preset region, mixing, based on the opacity of the corresponding primitive pixel point, a color of the corresponding primitive pixel point and a background color to determine a final rendered color of the pixel point.

In some embodiments, the performing a ray-tracing operation on the pixel point to obtain a ray-tracing result and performing the physical rendering operation based on the ray-tracing result further may include for each pixel point in the target image, in response to a determination that the pixel point is neither a primitive pixel point nor a volume data pixel point in the preset region, designating a background color of the pixel point as the final rendered color of the pixel point.

In some embodiments, the primitive may include a mesh primitive, a point primitive, or a line primitive.

In some embodiments, the preset primitive is a bounding box or a clipping surface that interacts with at least a portion of the volume data within the preset region.

In some embodiments, the primitive having the predetermined shape is obtained based on a user input.

According to another aspect of the present disclosure, a system is provided. The system may include at least one non-transitory storage medium including a set of instructions for determining a target data processing model; and at least one processor in communication with the at least one non-transitory storage medium, wherein when executing the set of instructions, the at least one processor is configured to cause the system to perform operations including: rasterizing a primitive having a predetermined shape to determine rendering parameters of primitive pixel points representing the primitive in a target image; determining depth of volume data pixel points representing volume data in a preset region in the target image; and performing a physical rendering operation on the volume data to obtain the target image based on depth of the volume data pixel points, color information of the volume data pixel points, and the rendering parameters, wherein the rendering parameters at least include depth of the primitive pixel points and color information of the primitive pixel points.

According to yet another aspect of the present disclosure, an image rendering device is provided. The image rendering device may include an element rendering module, configured to rasterize a primitive having a preset shape, and determine rendering parameters of primitive pixel points representing the primitive in a target image. The image rendering device may further include a volume data depth determination module configured to determine depth of the volume data pixel points representing volume data in the preset region in the target image. The image rendering device may further include a volume data rendering module, configured to perform a physical rendering operation on the volume data to obtain the target image based on depth of the volume data pixel points, color information of the volume data pixel points, and the rendering parameters, wherein the rendering parameters at least include depth of the primitive pixel points and color information of the primitive pixel points.

According to still another aspect of the present disclosure, a computing device is provided. The computing device includes one or more processors and a storage device for storing one or more programs. When the one or more programs are executed by the one or more processors, the one or more processors perform an image rendering method including: rasterizing a primitive having a predetermined shape to determine rendering parameters of primitive pixel points representing the primitive in a target image; determining depth of volume data pixel points representing volume data in a preset region in the target image; and performing a physical rendering operation on the volume data to obtain the target image based on depth of the volume data pixel points, color information of the volume data pixel points, and the rendering parameters, wherein the rendering parameters at least include depth of the primitive pixel points and color information of the primitive pixel points.

According to still another aspect of the present disclosure, a computer readable storage medium is provided, which stores a computer program, wherein when executed by the processor, the computer program implements an image rendering method including: rasterizing a primitive having a predetermined shape to determine rendering parameters of primitive pixel points representing the primitive in a target image; determining depth of volume data pixel points representing volume data in a preset region in the target image; and performing a physical rendering operation on the volume data to obtain the target image based on depth of the volume data pixel points, color information of the volume data pixel points, and the rendering parameters, wherein the rendering parameters at least include depth of the primitive pixel points and color information of the primitive pixel points.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 4 is a flowchart of an exemplary image rendering method according to some embodiments of the present disclosure;

DETAILED DESCRIPTION

Figure 1:
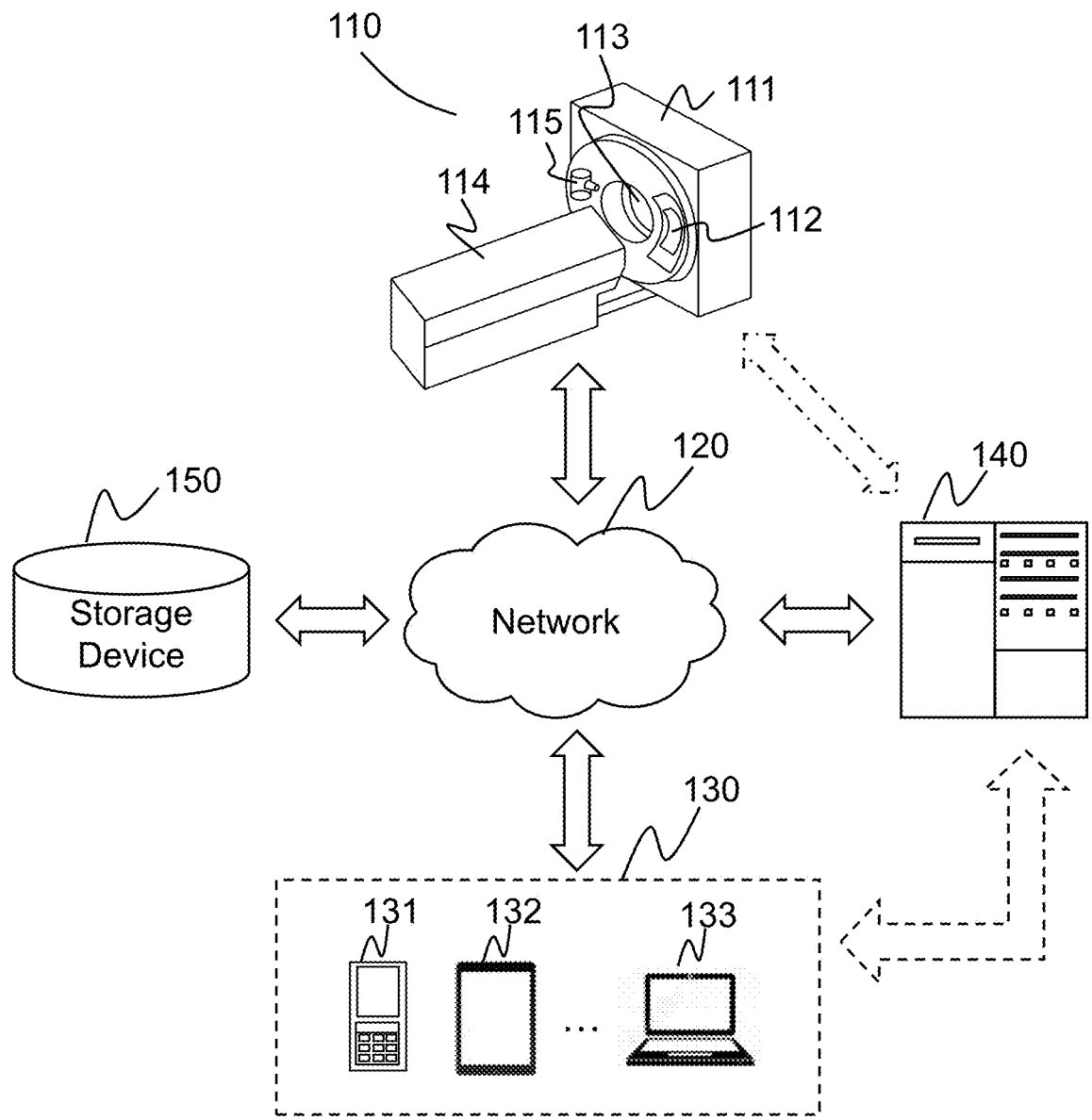
FIG. 1 is a schematic diagram illustrating an exemplary imaging system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for an imaging system. In some embodiments, the imaging system may include a single modality imaging system and/or a multi-modality imaging system. The single modality imaging system may include, for example, an X-ray imaging system, an computed tomography (CT) system, a magnetic resonance imaging (MRI) system, an ultrasonography system, a positron emission tomography (PET) system, or the like, or any combination thereof. The multi-modality imaging system may include, for example, an X-ray imaging-magnetic resonance imaging (X-ray-MRI) system, a positron emission tomography-X-ray imaging (PET-X-ray) system, a single photon emission computed tomography-magnetic resonance imaging (SPECT-MRI) system, a positron emission tomography-computed tomography (PET-CT) system, a C-arm system, a digital subtraction angiography-magnetic resonance imaging (DSA-MRI) system, etc. It should be noted that the imaging system described below is merely provided for illustration purposes, and not intended to limit the scope of the present disclosure.

FIG. 1 is a schematic diagram illustrating an exemplary image rendering system 100 according to some embodiments of the present disclosure. As shown, the image rendering system 100 may include an imaging device 110, a network 120, one or more terminals 130, a processing device 140, and a storage device 150. In some embodiments, the imaging device 110, the terminal(s) 130, the processing device 140, and/or the storage device 150 may be connected to and/or communicate with each other via a wireless connection (e.g., the network 120), a wired connection, or a combination thereof. The connection between the components of the image rendering system 100 may be variable. Merely by way of example, the imaging device 110 may be connected to the processing device 140 through the network 120, as illustrated in FIG. 1. As another example, the imaging device 110 may be connected to the processing device 140 directly. As a further example, the storage device 150 may be connected to the processing device 140 through the network 120, as illustrated in FIG. 1, or connected to the processing device 140 directly. As still a further example, a terminal 130 may be connected to the processing device 140 through the network 120, as illustrated in FIG. 1, or connected to the processing device 140 directly.

Merely by way of example, the imaging device 110 may generate or provide image data via scanning a subject (e.g., a patient) disposed on a scanning table of the imaging device 110. The image data may be rendered to generate a target image. In some embodiments, the imaging device 110 may include a single-modality scanner and/or multi-modality scanner. The single-modality scanner may include, for example, a computed tomography (CT) scanner. The multi-modality scanner may include a single photon emission computed tomography-computed tomography (SPECT-CT) scanner, a positron emission tomography-computed tomography (PET-CT) scanner, a computed tomography-ultrasonic (CT-US) scanner, a digital subtraction angiography-computed tomography (DSA-CT) scanner, or the like, or a combination thereof. In some embodiments, the image data may include projection data, images relating to the subject, etc. The projection data may be raw data generated by the imaging device 110 by scanning the subject or data generated by a forward projection on an image relating to the subject. In some embodiments, the subject may include a body, a substance, an object, or the like, or a combination thereof. In some embodiments, the subject may include a specific portion of a body, such as a head, a thorax, an abdomen, or the like, or a combination thereof. In some embodiments, the subject may include a specific organ or region of interest, such as an esophagus, a trachea, a bronchus, a stomach, a gallbladder, a small intestine, a colon, a bladder, a ureter, a uterus, a fallopian tube, etc.

In some embodiments, the imaging device 110 may include a gantry 111, a detector 112, a detecting region 113, a scanning table 114, and a radioactive scanning source 115. The gantry 111 may support the detector 112 and the radioactive scanning source 115. A subject may be placed on the scanning table 114 to be scanned. The radioactive scanning source 115 may emit radioactive rays to the subject. The radiation may include a particle ray, a photon ray, or the like, or a combination thereof. In some embodiments, the radiation may include a plurality of radiation particles (e.g., neutrons, protons, electron, p-mesons, heavy ions), a plurality of radiation photons (e.g., X-ray, a y-ray, ultraviolet, laser), or the like, or a combination thereof. The detector 112 may detect radiations and/or radiation events (e.g., gamma photons) emitted from the detecting region 113. In some embodiments, the detector 112 may include a plurality of detector units. The detector units may include a scintillation detector (e.g., a cesium iodide detector) or a gas detector. The detector unit may be a single-row detector or a multi-rows detector.

In some embodiments, the imaging device 110 may be integrated with one or more other devices that may facilitate the scanning of the subject, such as an image-recording device. The image-recording device may be configured to take various types of images related to the subject. For example, the image-recording device may be a two-dimensional (2D) camera that takes pictures of the exterior or outline of the subject. As another example, the image-recording device may be a 3D scanner (e.g., a laser scanner, an infrared scanner, a 3D CMOS sensor) that records the spatial representation of the subject.

In some embodiments, the imaging device 110 may be optional. For example, the image data may be obtained directly from the storage device 150, the terminal 130, an external device, or the like.

The network 120 may include any suitable network that can facilitate exchange of information and/or data for the image rendering system 100. In some embodiments, one or more components of the image rendering system 100 (e.g., the imaging device 110, the processing device 140, the storage device 150, the terminal(s) 130) may communicate information and/or data with one or more other components of the image rendering system 100 via the network 120. For example, the processing device 140 may obtain image data from the imaging device 110 via the network 120. As another example, the processing device 140 may obtain user instruction(s) from the terminal(s) 130 via the network 120. The network 120 may be or include a public network (e.g., the Internet), a private network (e.g., a local area network (LAN)), a wired network, a wireless network (e.g., an 802.11 network, a Wi-Fi network), a frame relay network, a virtual private network (VPN), a satellite network, a telephone network, routers, hubs, switches, server computers, and/or any combination thereof. For example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the image rendering system 100 may be connected to the network 120 to exchange data and/or information.

The terminal(s) 130 may be connected to and/or communicate with the imaging device 110, the processing device 140, and/or the storage device 150. For example, the terminal(s) 130 may obtain an image from the processing device 140 and display the image to the user. As another example, the user may define a preset region of the processed image using one or more primitives (e.g., a bounding box) via the terminal(s) 130. The preset region may indicate a region of the processed image that the user is interested in. In some embodiments, the terminal(s) 130 may include a mobile device 131, a tablet computer 132, a laptop computer 133, or the like, or any combination thereof. For example, the mobile device 131 may include a mobile phone, a personal digital assistant (PDA), a gaming device, a navigation device, a point of sale (POS) device, a laptop, a tablet computer, a desktop, or the like, or any combination thereof. In some embodiments, the terminal(s) 130 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing device 140 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the terminal(s) 130 may be part of the processing device 140.

The processing device 140 may process data and/or information obtained from the imaging device 110, the storage device 150, the terminal(s) 130, or other components of the image rendering system 100. For example, the processing device 140 may reconstruct an image based on projection data generated by the imaging device 110. As another example, the processing device 140 may determine a preset region of an image based on a user input from the terminal(s) 130. As yet another example, the processing device 140 may perform an image rendering process on the image and generate a target image to be presented to the user. In some embodiments, the processing device 140 may be a single server or a server group. The server group may be centralized or distributed. In some embodiments, the processing device 140 may be local to or remote from the image rendering system 100. For example, the processing device 140 may access information and/or data from the imaging device 110, the storage device 150, and/or the terminal(s) 130 via the network 120. As another example, the processing device 140 may be directly connected to the imaging device 110, the terminal(s) 130, and/or the storage device 150 to access information and/or data. In some embodiments, the processing device 140 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 140 may be implemented by a computing device 212 having one or more components as described in connection with FIG. 2.

The storage device 150 may store data, instructions, and/or any other information. In some embodiments, the storage device 150 may store data obtained from the processing device 140, the terminal(s) 130, and/or the storage device 150. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform as described elsewhere in the disclosure.

In some embodiments, the storage device 150 may be connected to the network 120 to communicate with one or more other components of the image rendering system 100 (e.g., the processing device 140, the terminal(s) 130). One or more components of the image rendering system 100 may access the data or instructions stored in the storage device 150 via the network 120. In some embodiments, the storage device 150 may be part of the processing device 140.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage device 150 may be a data storage including cloud computing platforms, such as public cloud, private cloud, community, and hybrid clouds, etc. However, those variations and modifications do not depart the scope of the present disclosure.

Figure 2:
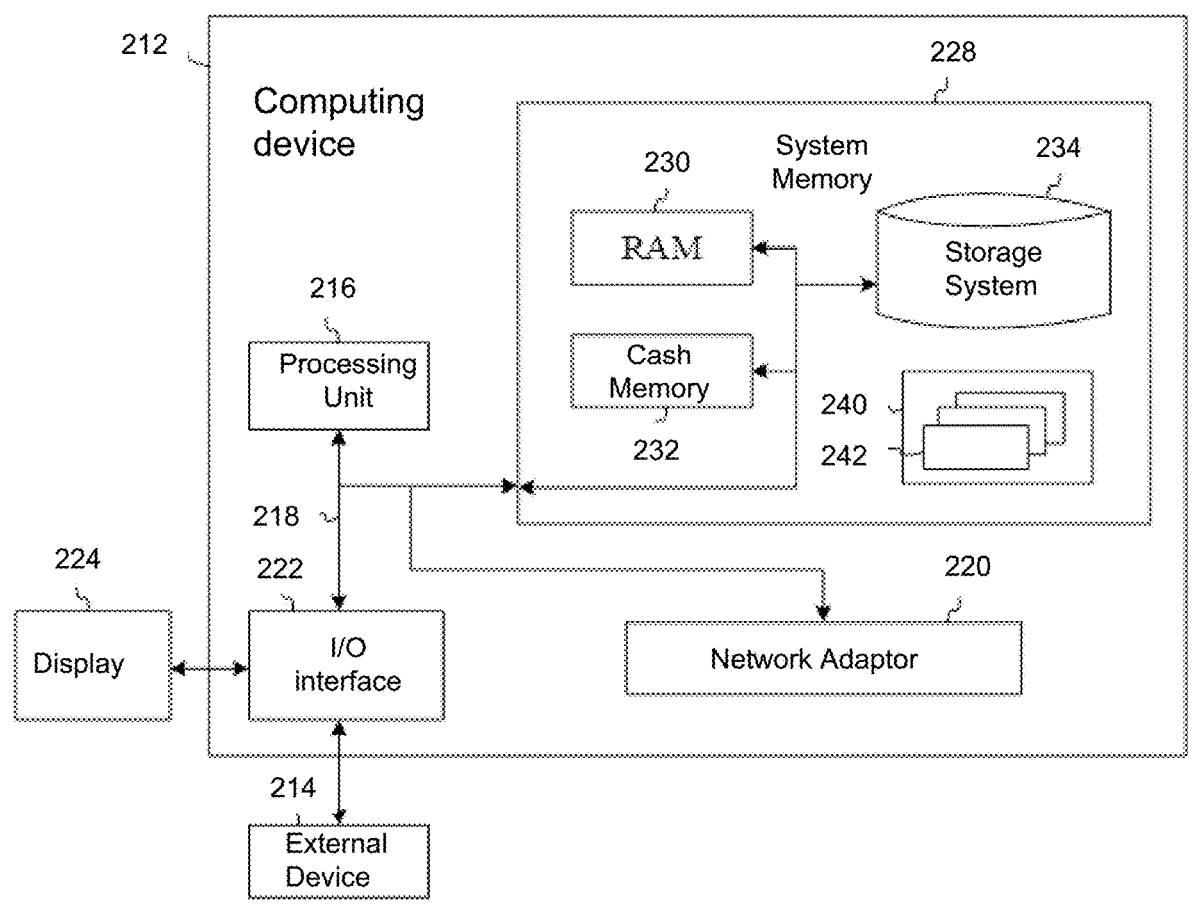
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the computing device can be connected to a medical imaging device (e.g., the imaging device 110) for obtaining medical image data acquired by the medical imaging device. In some embodiments, the computing device can be connected to a storage device (e.g., the storage device 150) to obtain other types of image data and perform a physical rendering operation. The computing device 212 shown in FIG. 2 is only an example, and should not bring any limitation to the function and application scope of the embodiments of the present disclosure.

As shown in FIG. 2, the computing device 212 is illustrated in the form of a general-purpose computing device. The components of the computing device 212 may include, but are not limited to: one or more processing units 214 (or one or more processors), a system memory 228, and a bus 218 connecting different system components (including the system memory 228 and the processing unit 214).

The bus 218 represents one or more of several types of bus structures, including a memory bus or a memory controller, a peripheral bus, a graphics acceleration port, a processor, or a local bus using any bus structure among multiple bus structures. For example, these architectures include but are not limited to industry standard architecture (ISA) bus, microchannel architecture (MAC) bus, enhanced ISA bus, Video Electronics Standards Association (VESA) local bus, and peripheral component interconnection (PCI) bus.

The computing device 212 typically includes a variety of computer system readable media. These media may be any available media that can be accessed by the computing device 212, including volatile and nonvolatile media, removable and non-removable media.

The system memory 228 may include a computer system readable medium in the form of volatile memory, such as random access memory (RAM) 230 and/or cache memory 232. The computing device 212 may further include other removable/non-removable, volatile/nonvolatile computer system storage media. For example only, the storage system 234 may be used to read and write non-removable, nonvolatile magnetic media (not shown in FIG. 2, but generally referred to as a "hard drive"). Although not shown in FIG. 2, a disk drive for reading and writing to removable nonvolatile disks (such as "floppy disks") and a removable non-volatile optical disk (such as CD-ROM, DVD-ROM) can be provided. Or other optical media) CD-ROM drive for reading and writing. In these cases, each drive may be connected to the bus 218 through one or more data media interfaces. The memory 228 may include at least one program product, and the program product has a set of (for example, at least one) program modules, and these program modules are configured to perform the functions of the embodiments of the present disclosure.

A program/utility tool 240 having a set of (at least one) program modules 242 may be stored in, for example, the memory 228. Such program module 232 includes but is not limited to an operating system, one or more application programs, other program modules, and program data Each of these examples or some combination may include the implementation of a network environment. The program module 232 generally executes the functions and/or methods in the described embodiments of the present disclosure.

The computing device 212 can also communicate with one or more external devices 214 (such as a keyboard, pointing device, display 224, etc.), and can also communicate with one or more devices that enable a user to interact with the computing device 212, and/or communicate with Any device (such as a network card, modem, etc.) that enables the computing device 212 to communicate with one or more other computing devices. Such communication can be performed through an input/output (I/O) interface 222. In addition, the computing device 212 may also communicate with one or more networks (for example, a local area network (LAN), a wide area network (WAN), and/or a public network, such as the Internet) through the network adapter 220. As shown in the figure, the network adapter 220 communicates with other modules of the computing device 212 through the bus 218. It should be understood that although not shown in FIG. 2, other hardware and/or software modules can be used in conjunction with the computing device 212, including but not limited to: microcode, device drivers, redundant processing units, external disk drive arrays, RAID systems, tapes Drives and data backup storage systems, etc.

The processing unit 216 executes various functional applications and data processing by running programs stored in the system memory 228, for example, to implement the image rendering method according to some embodiments of the present disclosure. For example, the method may include a process 400 that will be described in connection with FIG. 4.

Figure 3:
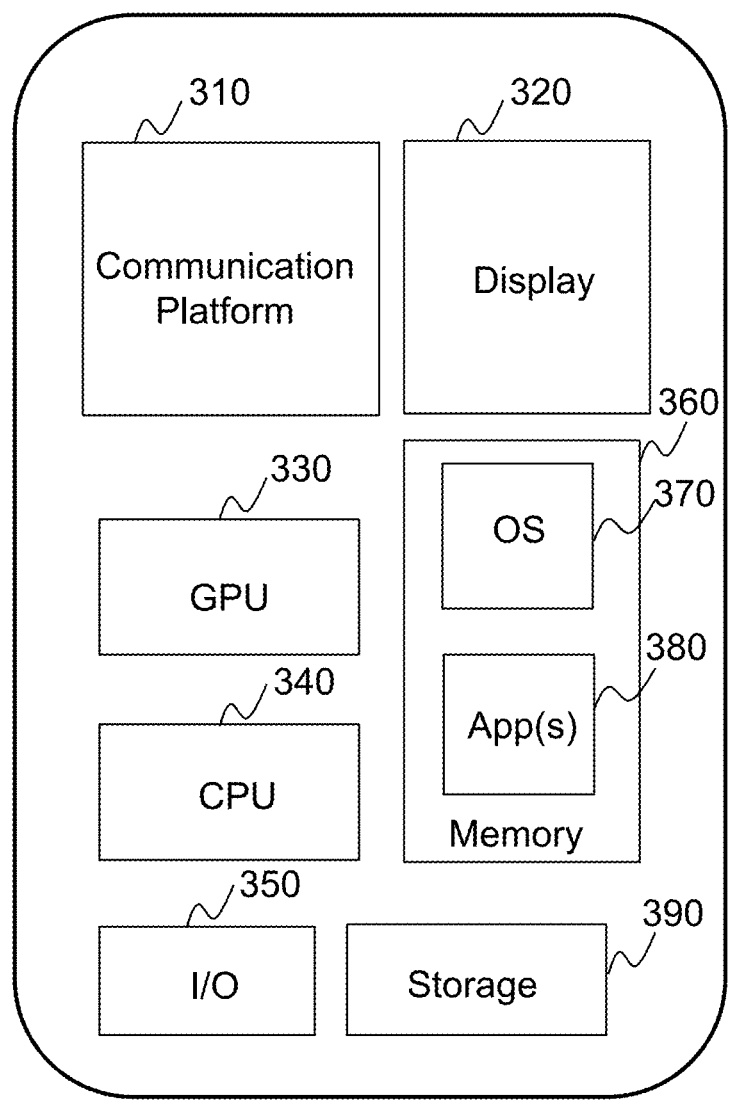
FIG. 3 is a schematic diagram illustrating exemplary hardware and/or software components of an exemplary terminal device according to some embodiments of the present disclosure.

FIG. 3 is a schematic diagram illustrating exemplary hardware and/or software components of an exemplary terminal device 300 on which the terminals 130 may be implemented according to some embodiments of the present disclosure. As illustrated in FIG. 3, the terminal device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the terminal device 300. In some embodiments, an operating system 370 (e.g., iOS™, Android™, Windows Phone™) and one or more applications 380 may be loaded into the memory 360 from the storage 390 in order to be executed by the CPU 340. The applications 380 may include a browser or any other suitable apps for receiving and rendering information relating to image processing or other information from the processing device 140. User interactions with the information stream may be achieved via the I/O 350 and provided to the processing device 140 and/or other components of the image rendering system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

FIG. 4 is a flowchart of an exemplary image rendering method according to some embodiments of the present disclosure. At least a portion of process 400 may be implemented on the computing device 212 as illustrated in FIG. 2 or the terminal device 300 as illustrated in FIG. 3. In some embodiments, one or more operations of the process 400 may be implemented in the image rendering system 100 as illustrated in FIG. 1. In some embodiments, one or more operations in the process 400 may be stored in the storage device 150 and/or the system memory 228 as a form of instructions, and invoked and/or executed by the processing device 140 or the processing unit 216. In some embodiments, the instructions may be transmitted in a form of electronic current or electrical signals.

In some embodiments, the process 400 may be performed by the image rendering device to generate an image that simultaneously presents at least one primitive and volume data.

As shown in FIG. 4, the image rendering method may include the following operations.

In 410, a primitive that has a predetermined shape may be rasterized to determine rendering parameters of primitive pixel points in a target image.

In some embodiments, the target image refers to an image to be obtained. For example, the target image may be obtained by performing the rendering operation on the volume data.

As used herein, a primitive refers to a kind of graphic data, which may be an image that can be drawn and displayed on an interface, such as in the form of a point, a line, and a surface. In some embodiments, the primitives may include grid primitives that interact with the volume data in a region of interest, such as bounding boxes and clipping surfaces, which may be used to adjust the preset region of the volume data, so as to make it more convenient to observe the volume data, such as the structure and organization of a certain part of the human body in the volume data. Therefore, in some embodiments, the grid primitives such as the bounding box and the clipping surface along with the volume data need to be rendered in the same scene.

Figure 7:
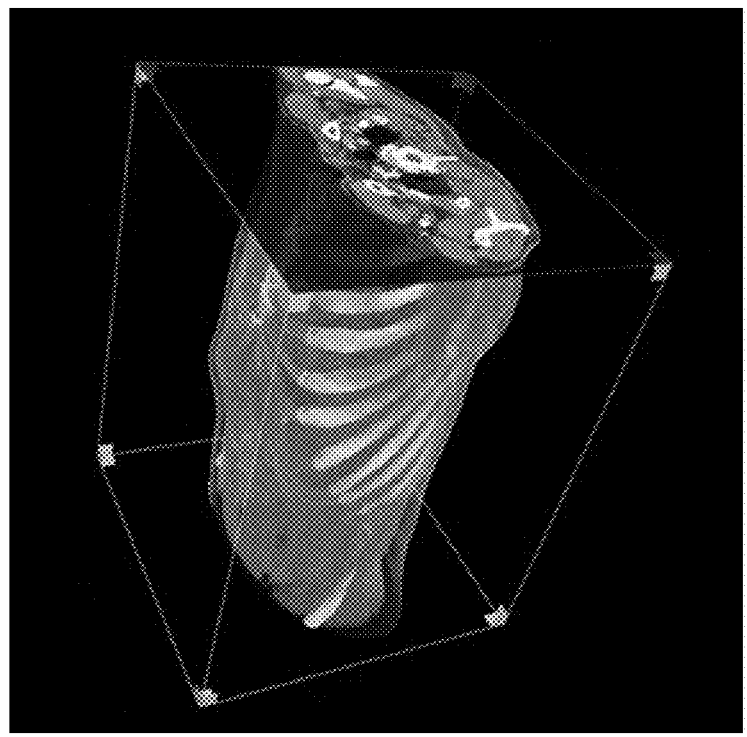
FIG. 7 is an exemplary target image according to some embodiments of the present disclosure.

In some embodiments, the image rendering device may obtain the primitive based on a user input. For instance, a user may view the volume data through a terminal device and draw the primitive on the terminal device to select a preset region (indicating a region of interest) of the volume data. The primitive may have various shapes which are not limited by the present disclosure. For example, the primitive may be a combination of a bounding box and a clipping surface, as shown in FIG. 7. As another example, the primitive may be an irregular shape defined by the user. It should be noted that there can be multiple primitives that need to be rendered with the volume data. For example, the multiple primitives may represent multiple preset regions of the volume data. The multiple primitives and multiple regions of interest of the volume data may be simultaneously displayed in the same target image. Alternatively, a plurality of target images may be generated each presenting a single preset region. As anther example, the multiple primitives may include a graphical mark inputted by the user. The graphical mark may be used to indicate specific information related to the volume data, such as to mark the position of a tumor, a polypus, a metal implant, etc.

In some embodiments, the target image may be displayed to a user via a terminal device. The preset region may define a region of the volume data to be displayed to the user. In this case, the target image is also referred to as a target display image, and the preset region is also referred to as a display region. In some embodiments, the target image may be transmitted to a storage device (e.g., the storage device 150 of the image rendering system 100).

In this operation, the primitive may be firstly rendered by rasterization. Rasterization may be a process of transforming a primitive into a two-dimensional image, and the rendering parameters of each primitive pixel point can be determined. The rendering parameters of each pixel point on the two-dimensional image may include the spatial position, the color, and the depth of the pixel point. When the rendering parameters include texture information, the color information can be determined according to the texture information. For example, when the user draws the primitive, the user may determine a texture of the primitive or modify a default texture of the primitive. Specifically, the position coordinates of pixel points, as well as information such as color and depth data, may be determined by interpolating the vertex data of the position where the primitive may be displayed in the target image. That is, the mathematical description of the primitive and the color information related to the primitive may be converted into the position information and the color information of the pixel point in the corresponding position in the target image. Rasterization rendering can be utilized to render both point primitives and line primitives that cannot be ray-traced.

In 420, depth of volume data pixel points in a preset region in the target image may be determined.

After the rasterization of the primitive, the depth of each pixel point corresponding to the volume data in the preset region should be further determined to prepare for the process of ray-tracing the volume data. In some embodiments, volume data may be composed of voxels, which may be basic volume elements, which can also be understood as points or a small region with a particular arrangement and a color in a three-dimensional space. In some embodiments, the volume data may be medical volume data representing the medical image data of a subject. The volume data can be captured by MRI (Magnetic Resonance Imaging), CT (Computed tomography, X-ray computer tomography), PET (positron emission tomography, positron emission tomography) or echolocation, or other technologies. The volume data can also be generated by physical simulation (such as fluid dynamics or particle systems). In some embodiments, the volume data may be other types of data, such as gaming modeling data, a frame of animation data, etc., which are not limited by the present disclosure.

The preset region may be predetermined. For example, an initial preset region may include the entire volume data (e.g., represented in the form of a rectangular solid). In some embodiments, the initial preset region may be designed as the preset region by the user. In some embodiments, if the user wants to view only a region of interest of the volume data, he/she can adjust the size/shape of the rectangular solid to display only the region of interest. In an embodiment, it may be also possible to display only the volume data content in any one slice of the rectangular solid.

In some embodiments, in a specific implementation, the rasterization feature of the GPU can be utilized to draw a rectangular solid that may be consistent with the volume data preset region. Depending on whether it is a cut surface, the volume data can be cropped with a plane. A depth test may be conducted on the volume data pixel points, and only the volume data pixel points with smaller depth may pass the depth test. The depth of the final drawn image (in the GPU depth buffer) may be the depth of the preset region corresponding to each of the volume data pixel points in the target image. In some embodiments, the depth of the volume data pixel points may be determined by performing the ray-tracing operation on the volume data based on a pixel point. For example, for each pixel point in the target image, the ray-tracing operation may be performed on the volume data based on the pixel point to form an optical path, and the depth of the pixel point may be determined based on a distance sampling. Specifically, a plurality of sampling points located on the optical path may be determined based on a fixed step length or a variable step length. The first sampling point of the sampling points located in the volume data may be determined. The depth of the pixel point may be determined based on the first sampling point, and the depth of the pixel point may be used to determine the depth of the volume data pixel point corresponding to the pixel point within the preset region. Alternatively, at least two candidate sampling points of the sampling points located in the volume data may be determined. The depth of the pixel point may be determined based on the at least two candidate sampling points located in the volume data by using a statistical average calculation, an interpolation calculation, or the like, and the depth of the pixel point may be used to determine the depth of the volume data pixel point corresponding to the pixel point within the preset region. As another example, for each pixel point in the target image, a position (i.e., a position where a first collision occurs in the volume data) where a first collision between the optical path and the volume data occurs may be determined by using a collision detection. The depth of the pixel point may be determined based on the position where the first collision occurs, and the depth of the pixel point may be used to determine the depth of the volume data pixel point corresponding to the pixel point within the preset region. Alternatively, other methods that can calculate the depth of the pixel point can be used to determine the depth of the volume data pixel points within the preset region, which is not specifically limited in some embodiments.

In 430, a physical rendering operation may be performed to obtain the target image based on a physical rendering operation on the volume data to obtain the target image based on depth of the volume data pixel points, color information of the volume data pixel points, and the rendering parameters, wherein the rendering parameters at least include depth of the primitive pixel points and color information of the primitive pixel points.

In this operation, the target image may be obtained through: rendering the volume data by means of ray-tracing, and superimposing the result of the volume data rendering with the result of the primitive rasterization rendering.

Specifically, firstly, for each pixel point position in the target image, according to the depth relationship between a primitive pixel point corresponding to the pixel point position and a volume data pixel point corresponding to the pixel point position, whether the volume data pixel point need to be ray-traced may be determined. For volume data pixel points that need to receive the ray-tracing operation, the result returned by ray-tracing, including information such as the color of the pixel, may be used as the final rendering result of the pixel; for volume data pixel points that do not need to receive the ray-tracing operation, the background color of the pixel point or the color of the corresponding pixel point pixel point may be displayed as the final rendering result for the pixel point. In this way, the light and shadow display effects between primitives and volume data will not affect each other, making the target image more intuitive and natural to the user.

Merely by way of example, for each pixel point in the target image, a determination of whether to perform ray-tracing on the pixel point may be conducted according to the following process. When the pixel point is both a primitive pixel point and a volume data pixel point, the depth of the primitive pixel point corresponding to the pixel point is less than the depth of the corresponding volume data pixel, and the opacity of the pixel point is less than the opacity of the primitive pixel point, the color data of the primitive pixel point corresponding to the pixel point may be designated as the color data of the pixel, that is, the pixel point that meets the above conditions does not need to be ray-traced. In some embodiments, it can be understood that at the same pixel point position, the primitive pixel point with a small depth may be displayed, which may be equivalent to that the volume data pixel point with a larger depth may be covered by the primitive pixel point. In some embodiments, the opacity of each pixel point may be a random value generated in the process of rasterizing the primitive in step 410, and the pixel point with a small opacity may be blocked by the pixel point with a large opacity.

In response to a determination that the pixel point is not a primitive pixel or the pixel point is not a volume data pixel point, or a determination that the depth of the corresponding primitive pixel point is greater than or equal to the depth, or a determination that the opacity of the pixel point is greater than or equal to the opacity of the primitive pixel point, ray-tracing may be conducted on the pixel point according to the gray value of the volume data, and the mapping relationship from gray to red, green, and blue primary color information, and opacity. According to the tracking result, the color of the pixel point may be determined, and the physical rendering of the volume data may be completed to obtain the target image.

In the process of ray-tracing, when the pixel point is both a primitive pixel point and a volume data pixel point, the depth of the primitive pixel point corresponding to the pixel point is less than the depth of the corresponding volume data pixel point, and the opacity of the pixel point is less than the opacity of the corresponding primitive pixel point, then the color of the corresponding primitive pixel point and the background color of may be mixed according to the opacity to obtain the final rendering color of the pixel point. If the pixel point is both a primitive pixel point and a volume data pixel point, the depth of the primitive pixel point corresponding to the pixel point is greater than the depth of the corresponding volume data pixel, the opacity of the corresponding volume data pixel point is zero, then the color of the corresponding primitive pixel point and the background color of the pixel point may be mixed according to the opacity of the corresponding primitive pixel, to obtain the final rendering color of the pixel. The depth of the primitive pixel point may be greater than the depth of the corresponding volume data pixel, which means that for the pixel, the volume data pixel point covers the primitive pixel, but the opacity of the volume data pixel point may be zero, which means that the volume data may be transparent, and the primitive pixel point needs to be displayed at the pixel point position. According to the opacity of the corresponding primitive pixel, the color of the corresponding primitive pixel point and the background color of the pixel point may be mixed as the color of the pixel. This may be achieved through color interpolation calculation based on the opacity. It should be noted here that the background color may be generally a preset pure color or a color taken from the environment map according to the direction of the light. Pixel points without corresponding primitive pixel points will be confirmed as a default color in the rasterization process of step 410. Otherwise, the pixel point may be a primitive pixel point and a volume data pixel point at the same time, and the depth of the primitive pixel point corresponding to the pixel point may be greater than the depth of the corresponding volume data pixel, and the opacity of the corresponding volume data pixel point may be greater than zero. The color determined by the ray-tracing of the volume data pixel point may be used as the final rendering color of the pixel.

In addition, when the pixel point is both a primitive pixel point and a volume data pixel point that is not within the preset region, the color of the corresponding primitive pixel point may be mixed with the background color of the pixel point based on the opacity of the primitive pixel point corresponding to the pixel so as to obtain the final rendered color for the pixel point. When the pixel point is neither a primitive pixel point nor a volume data pixel point in the preset region, the background color of the pixel point may be designated as the final rendered color of the pixel. That is, when the light does not intersect with the volume data in the preset region or directly passes through the volume data, the background color can be directly used.

Figure 5:
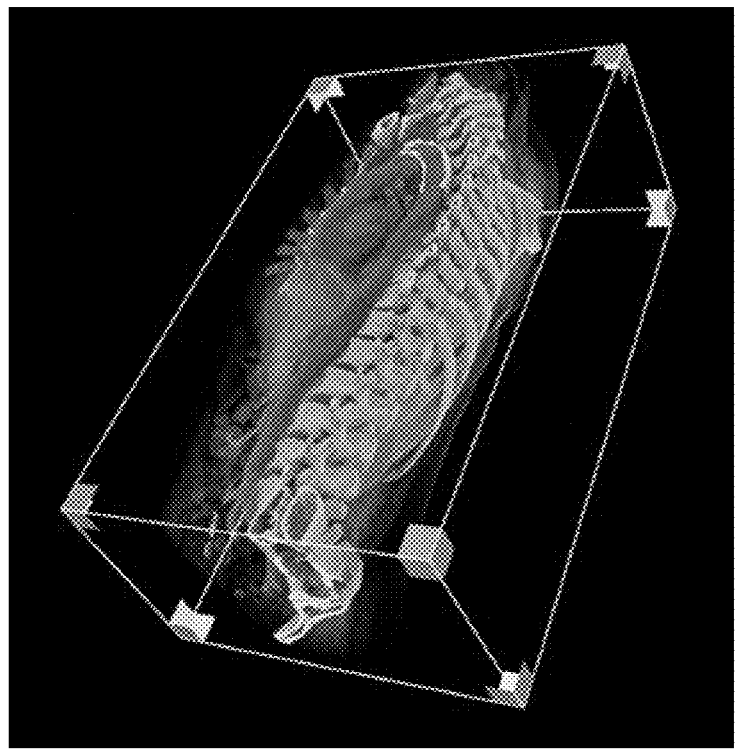
FIG. 5 is an exemplary target image according to some embodiments of the present disclosure.

In a specific example, the image rendering effect may be shown in FIG. 5. When the user browses the physical rendering result of the volume data, in order to be able to see the structure of the volume data section more intuitively, the volume data needs to be displayed with a bounding box that adjusts the preset region. FIG. 5 may be the result of mixing the bounding box drawn by rasterization and the physical rendering result of volume data according to the above process. It can be seen that the light and shadow effects of the bounding box and volume data does not affect each other, and the bounding box may be displayed correctly. The in-depth relationship with volume data conforms to the user interaction logic.

Figure 6:
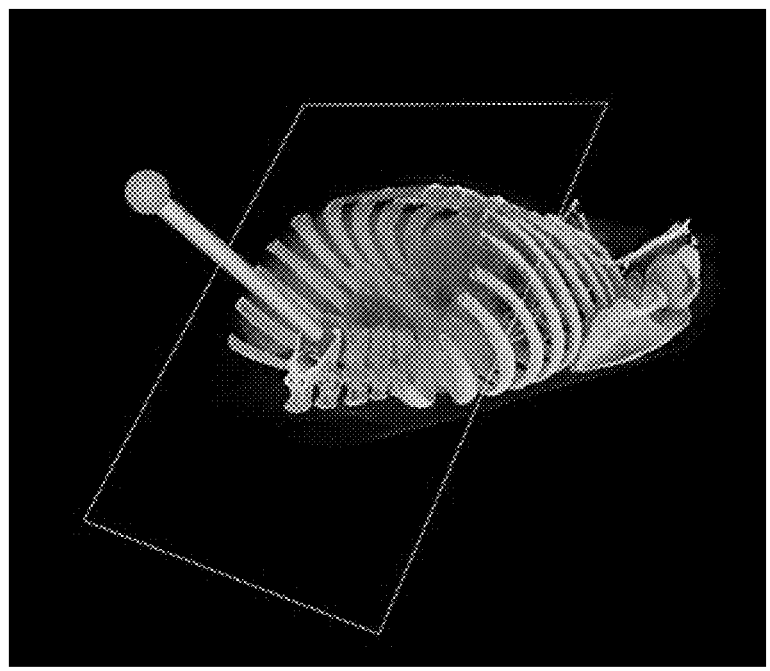
FIG. 6 is an exemplary target image according to some embodiments of the present disclosure.

Furthermore, in order to view the internal organization of the volume data, the user may desire to cut the volume data using a clipping surface to show the structure of the internal organs that the user is interested in. FIG. 6 shows the mixing result of the rasterized clipping surface and the physical rendering results of the volume data in the corresponding preset region, which can intuitively reflect the positional relationship between the cut surface and the volume data, and the user can adjust the position and normal vector of the cropped surface through the operation handle in FIG. 6 to obtain a rendering result that meets the user's expectations.

In an embodiment, during the rendering process of rasterization, the transversal position of volume data obtained from multi-planner reformation (MPR) is drawn on the upper surface of the bounding box according to the position and size. An exemplary result is shown in FIG. 7. As can be seen, the clipping surface is set to be semi-transparent, mixed with the result of physical rendering of the volume data, so that users can combine the results of MPR and physical rendering of volume data to have a more intuitive and comprehensive observation of the parts of interest.

In the technical solution of some embodiments, to render the primitive pixels and the volume data pixels separately, the preset shape primitives may be firstly rasterized to determine the color information and depth of the corresponding primitive pixels in the target image. Then the depth of the volume data pixel point corresponding to the volume data in the preset region of the target image is determined. Based on the depth relationship between the depth of the primitive pixel point and the volume data pixel point at the same pixel position, the color information of the primitive pixels and the color information of the volume data pixels, the physical rendering of the volume data may be conducted to finally obtain the target image, which solves the problem of physical rendering of the primitive pixels and the volume data pixels at the same time. In this way, the problem that point or line primitives cannot be ray-traced may be solved. The light and shadow display effects of primitives and volume data do not affect each other, making the image effect more intuitive and natural, so that the primitives that cannot be physically rendered can also be displayed through rasterization. Since the calculation amount of rasterization is smaller than that of ray-tracing, and the physical rendering of ray-tracing is not performed on all pixels, the time needed for the entire rendering process may be significantly reduced.

It should be noted that the above description may be merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 8:
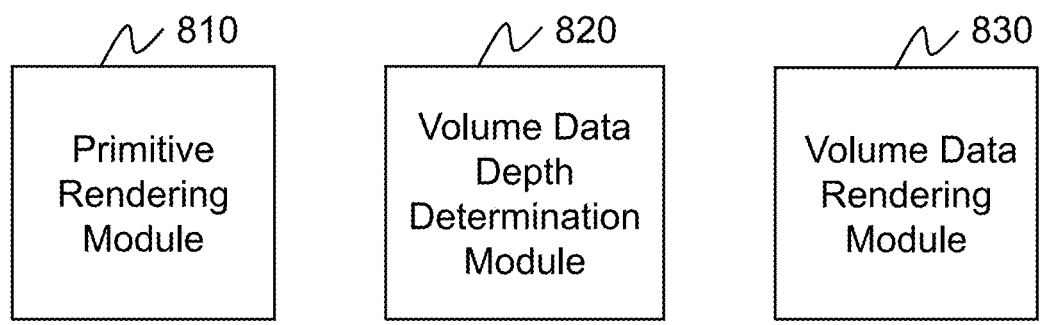
FIG. 8 is a block diagram illustrating an exemplary image rendering device according to some embodiments of the present disclosure.

As shown in FIG. 8, an exemplary image rendering device according to some embodiments of the present disclosure may include: a primitive rendering module 810, a volume data depth determining module 820, and a volume data rendering module 830.

The primitive rendering module 810 may be used to rasterize a primitive having a preset shape to determine the rendering parameters of the corresponding primitive pixel points in the target image. The volume data depth determining module 820 may be used to determine the target image, the volume data pixel point depth corresponding to the volume data within the preset region in the preset region. The volume data rendering module 830 may be configured to be based on the depth relationship between the depth in the rendering parameters at the same pixel point position and the volume data pixel point, and the color information in the rendering parameters and the color information of the volume data pixel points may be used to complete the physical rendering of the volume data to obtain the target image.

Optionally, the color information of the primitive pixel point and the color information of the volume data pixel point may include primary color information and opacity.

Optionally, the volume data rendering module 830 specifically may include: a first rendering sub-module used to, in response to a determination that the pixel point is both a primitive pixel point and a volume data pixel point, that depth of the corresponding primitive pixel point is less than depth of the corresponding volume data pixel point, and that the opacity of the pixel point is less than the opacity of the primitive pixel point, designating color data of the corresponding primitive pixel point as color data of the pixel point.

The volume data rendering module 830 may further include a second rendering sub-module that is used to perform ray-tracing on the pixel point when the pixel point does not meet the rendering conditions of the first rendering submodule, and complete the physical rendering of the volume data according to the ray-tracing result to obtain the target image.

Optionally, the second rendering sub-module may be specifically used for: in response to a determination that the pixel point is both a primitive pixel point and a volume data pixel point, that depth of the corresponding primitive pixel point is greater than depth of the corresponding volume data pixel point, and that the opacity of the pixel point is zero, mix, based on the opacity of the corresponding primitive pixel point, a color of the corresponding primitive pixel point and a background color to determine a final rendered color of the pixel point. Otherwise, the second rendering sub-module is configured to designating a color of the corresponding volume data pixel point as the final rendered color of the pixel point.

Optionally, the second rendering submodule can also be used for: in response to a determination that the pixel point is a primitive pixel point and that the pixel point is not a volume data pixel point in the preset region, mix, based on the opacity of the corresponding primitive pixel point, a color of the corresponding primitive pixel point and a background color to determine a final rendered color of the pixel point; and in response to a determination that the pixel point is neither a primitive pixel point nor a volume data pixel point in a preset region, designate a background color of the pixel point as the final rendered color of the pixel point.

Optionally, the primitive of the preset shape may include a grid primitive, a dot primitive, and a line primitive.

Optionally, the preset shape primitive may be a bounding box or a clipping surface that interacts with volume data in a preset region.

The image rendering device according to some embodiments of the present disclosure can execute the image rendering method provided by any embodiment of the present disclosure, and can have the functional modules and beneficial effects corresponding to the execution method.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2123, Perl, COBOL 2122, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

We claim:

1. An image rendering method, implemented on a computing device having at least one processor and at least one non-transitory storage medium, the method comprising:
   rasterizing a primitive having a predetermined shape to determine rendering parameters of primitive pixel points representing the primitive in a target image;
   determining depth of volume data pixel points representing volume data in a preset region in the target image; and
   performing a physical rendering operation on the volume data to obtain the target image based on the depth of the volume data pixel points, color information of the volume data pixel points, and the rendering parameters, wherein the rendering parameters at least include depth of the primitive pixel points and color information of the primitive pixel points; wherein
   the color information comprises primary color information and opacity; and
   the performing a physical rendering operation on the volume data to obtain the target image includes:
   for each pixel point in the target image,
      in response to a determination that the pixel point is not a primitive pixel or the pixel point is not a volume data pixel point, or a determination that the depth of the corresponding primitive pixel point is greater than or equal to the depth of the corresponding volume data pixel point, or a determination that opacity of the pixel point is greater than or equal to the opacity of the primitive pixel point,
      performing a ray-tracing operation on the pixel point to obtain a ray-tracing result, and
      performing the physical rendering operation based on the ray-tracing result;
   wherein the performing a ray-tracing operation on the pixel point to obtain a ray-tracing result and performing the physical rendering operation based on the ray-tracing result includes:
      for each pixel point in the target image, in response to a determination that the pixel point is a primitive pixel point and that the pixel point is not a volume data pixel point in the preset region, mixing, based on the opacity of the corresponding primitive pixel point, a color of the corresponding primitive pixel point and a background color to determine a final rendered color of the pixel point.

2. The method of claim 1, wherein the performing a ray-tracing operation on the pixel point to obtain a ray-tracing result and performing the physical rendering operation based on the ray-tracing result includes:
   for each pixel point in the target image,
      in response to a determination that the pixel point is both a primitive pixel point and a volume data pixel point, that the depth of the corresponding primitive pixel point is greater than the depth of the corresponding volume data pixel point, and that the opacity of the pixel point is zero,
         mixing, based on the opacity of the corresponding primitive pixel point, the color of the corresponding primitive pixel point and the background color to determine the final rendered color of the pixel point.

3. The method of claim 2, further including:
   for each pixel point in the target image, in response to a determination that the pixel point is both a primitive pixel point and a volume data pixel point, that the depth of the corresponding primitive pixel point is greater than the depth of the corresponding volume data pixel point, and that the opacity of the pixel point is not zero, designating a color of the corresponding volume data pixel point as the final rendered color of the pixel point.

4. The method of claim 1, wherein the performing a ray-tracing operation on the pixel point to obtain a ray-tracing result and performing the physical rendering operation based on the ray-tracing result further includes:
   for each pixel point in the target image, in response to a determination that the pixel point is neither a primitive pixel point nor a volume data pixel point in the preset region, designating the background color of the pixel point as the final rendered color of the pixel point.

5. The method of claim 1, wherein the primitive includes a mesh primitive, a point primitive, or a line primitive.

6. The method of claim 5, wherein preset shape primitive is a bounding box or a clipping surface that interacts with at least a portion of the volume data within the preset region.

7. The method of claim 1, wherein the primitive having the predetermined shape is obtained based on a user input.

8. The method of claim 1, further including:
   for each pixel point in the target image, in response to a determination that the pixel point is both a primitive pixel point and a volume data pixel point, that the depth of the corresponding primitive pixel point is less than the depth of the corresponding volume data pixel point, and that the opacity of the pixel point is less than the opacity of the primitive pixel point, designating color data of the corresponding primitive pixel point as color data of the pixel point.

9. The method of claim 1, wherein the determining depth of volume data pixel points representing volume data in a preset region in the target image includes:

for each pixel point in the target image,
performing the ray-tracing operation on the volume data based on the pixel point, and
determining depth of the pixel point based on a distance sampling or a position where a first collision occurs in the volume data through a collision detection; and
determining the depth of the volume data pixel points based on the depth of the pixel points.

10. A system, comprising:

at least one non-transitory storage medium including a set of instructions for determining a target data processing model; and at least one processor in communication with the at least one non-transitory storage medium, wherein when executing the set of instructions, the at least one processor is configured to cause the system to perform operations including:

rasterizing a primitive having a predetermined shape to determine rendering parameters of primitive pixel points representing the primitive in a target image;

determining depth of volume data pixel points representing volume data in a preset region in the target image; and performing a physical rendering operation on the volume data to obtain the target image based on the depth of the volume data pixel points, color information of the volume data pixel points, and the rendering parameters, wherein the rendering parameters at least include depth of the primitive pixel points and color information of the primitive pixel points; wherein the color information comprises primary color information and opacity; and the performing a physical rendering operation on the volume data to obtain the target image includes:

for each pixel point in the target image,
in response to a determination that the pixel point is not a primitive pixel or the pixel point is not a volume data pixel point, or a determination that the depth of the corresponding primitive pixel point is greater than or equal to the depth of the corresponding volume data pixel point, or a determination that opacity of the pixel point is greater than or equal to the opacity of the primitive pixel point,
performing a ray-tracing operation on the pixel point to obtain a ray-tracing result, and
performing the physical rendering operation based on the ray-tracing result:

wherein the performing a ray-tracing operation on the pixel point to obtain a ray-tracing result and performing the physical rendering operation based on the ray-tracing result includes:

for each pixel point in the target image, in response to a determination that the pixel point is a primitive pixel point and that the pixel point is not a volume data pixel point in the preset region, mixing, based on the opacity of the corresponding primitive pixel point, a color of the corresponding primitive pixel point and a background color to determine a final rendered color of the pixel point.

11. The system of claim 10, wherein the performing a ray-tracing operation on the pixel point to obtain a ray-tracing result and performing the physical rendering operation based on the ray-tracing result includes:

for each pixel point in the target image,
in response to a determination that the pixel point is both a primitive pixel point and a volume data pixel point, that the depth of the corresponding primitive pixel point is greater than the depth of the corresponding volume data pixel point, and that the opacity of the pixel point is zero,
mixing, based on the opacity of the corresponding primitive pixel point, the color of the corresponding primitive pixel point and the background color to determine the final rendered color of the pixel point.

12. The system of claim 11, further including:

for each pixel point in the target image, in response to a determination that the pixel point is both a primitive pixel point and a volume data pixel point, that the depth of the corresponding primitive pixel point is greater than the depth of the corresponding volume data pixel point, and that the opacity of the pixel point is not zero,
designating a color of the corresponding volume data pixel point as the final rendered color of the pixel point.

13. The system of claim 10, wherein the performing a ray-tracing operation on the pixel point to obtain a ray-tracing result and performing the physical rendering operation based on the ray-tracing result further includes:

for each pixel point in the target image, in response to a determination that the pixel point is neither a primitive pixel point nor a volume data pixel point in a preset region, designating the background color of the pixel point as the final rendered color of the pixel point.

14. The system of claim 10, further including:

for each pixel point in the target image, in response to a determination that the pixel point is both a primitive pixel point and a volume data pixel point, that the depth of the corresponding primitive pixel point is less than the depth of the corresponding volume data pixel point, and that the opacity of the pixel point is less than opacity of the primitive pixel point,
designating color data of the corresponding primitive pixel point as color data of the pixel point.

15. A computer readable storage medium, which stores a computer program, wherein when executed by the processor, the computer program implements an image rendering method including:

rasterizing a primitive having a predetermined shape to determine rendering parameters of primitive pixel points representing the primitive in a target image;

determining depth of volume data pixel points representing volume data in a preset region in the target image; and performing a physical rendering operation on the volume data to obtain the target image based on the depth of the volume data pixel points, color information of the volume data pixel points, and the rendering parameters, wherein the rendering parameters at least include depth of the primitive pixel points and color information of the primitive pixel points; wherein the color information comprises primary color information and opacity; and the performing a physical rendering operation on the volume data to obtain the target image includes:

for each pixel point in the target image,
in response to a determination that the pixel point is not a primitive pixel or the pixel point is not a volume data pixel point, or a determination that the depth of the corresponding primitive pixel point is greater than or equal to the depth of the corresponding volume data pixel point, or a determination that opacity of the pixel point is greater than or equal to the opacity of the primitive pixel point,
performing a ray-tracing operation on the pixel point to obtain a ray-tracing result, and
performing the physical rendering operation based on the ray-tracing result;
wherein the performing a ray-tracing operation on the pixel point to obtain a ray-tracing result and performing the physical rendering operation based on the ray-tracing result includes:
for each pixel point in the target image, in response to a determination that the pixel point is a primitive pixel point and that the pixel point is not a volume data pixel point in the preset region, mixing, based on the opacity of the corresponding primitive pixel point, a color of the corresponding primitive pixel point and a background color to determine a final rendered color of the pixel point.

* * * * *